US012731785B2

(12) United States Patent
Zhao et al.

(10) Patent No.: US 12,731,785 B2
(45) Date of Patent: Sep. 8, 2026

(54) POSITIVE ACTIVE MATERIAL, METHOD FOR PREPARING SAME, ELECTRODE PLATE, SECONDARY BATTERY, AND ELECTRICAL DEVICE

(71) Applicant: CONTEMPORARY AMPEREX TECHNOLOGY (HONG KONG) LIMITED, Hong Kong (CN)

(72) Inventors: Dong Zhao, Ningde (CN); Qi Wu, Ningde (CN); Chongheng Shen, Ningde (CN); Bangrun Wang, Ningde (CN); Qiang Chen, Ningde (CN); Jingpeng Fan, Ningde (CN); Na Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 282 days.

(21) Appl. No.: 18/412,601

(22) Filed: Jan. 15, 2024

(65) Prior Publication Data

US 2024/0199441 A1 Jun. 20, 2024

Related U.S. Application Data

(63) Continuation of application No. PCT/CN2022/097507, filed on Jun. 8, 2022.

(51) Int. Cl.

| | |
|---|---|
| ***C01G 53/50*** | (2025.01) |
| ***H01M 4/36*** | (2006.01) |
| ***H01M 4/485*** | (2010.01) |
| ***H01M 4/505*** | (2010.01) |
| ***H01M 4/525*** | (2010.01) |
| ***H01M 10/00*** | (2006.01) |
| *H01M 4/02* | (2006.01) |

(52) U.S. Cl.

CPC ............ *C01G 53/50* (2013.01); *H01M 4/366* (2013.01); *H01M 4/485* (2013.01); *H01M 4/505* (2013.01); *H01M 4/525* (2013.01); *H01M 10/00* (2013.01); *C01P 2002/08* (2013.01); *C01P 2004/61* (2013.01); *C01P 2004/84* (2013.01); *C01P 2006/12* (2013.01); *H01M 2004/021* (2013.01); *H01M 2004/028* (2013.01)

(58) Field of Classification Search

CPC .. C01G 53/50; C01P 2002/08; C01P 2004/61; C01P 2004/84; C01P 2006/12; H01M 10/00; H01M 10/052; H01M 10/0525; H01M 2004/021; H01M 2004/028; H01M 4/131; H01M 4/1391; H01M 4/36; H01M 4/366; H01M 4/485; H01M 4/505; H01M 4/525; H01M 4/5825; H01M 4/62

USPC .......................................................... 429/231

See application file for complete search history.

(56) References Cited

U.S. PATENT DOCUMENTS

| | | | | |
|---|---|---|---|---|
| 2014/0302392 | A1 | 10/2014 | Li et al. | |
| 2016/0276658 | A1* | 9/2016 | Choi | H01M 4/502 |
| 2017/0018767 | A1* | 1/2017 | Park | H01M 10/0525 |
| 2021/0119208 | A1* | 4/2021 | Choi | C01G 53/82 |

FOREIGN PATENT DOCUMENTS

| | | | | | |
|---|---|---|---|---|---|
| CN | 103928664 | A | | 7/2014 | |
| CN | 106745261 | A | | 5/2017 | |
| CN | 107785557 | A | | 3/2018 | |
| CN | 108878794 | A | * | 11/2018 | H01M 10/0525 |
| CN | 109256531 | A | | 1/2019 | |
| CN | 109560265 | A | | 4/2019 | |
| CN | 110061211 | A | | 7/2019 | |
| CN | 111434618 | A | | 7/2020 | |
| CN | 113823786 | A | | 12/2021 | |
| JP | 2014104234 | A | | 6/2014 | |
| JP | 2012129166 | A | * | 7/2015 | H01M 4/13 |
| JP | 2015130273 | A | | 7/2015 | |
| JP | 2019114327 | A | | 7/2019 | |
| KR | 20170133188 | A1 | | 12/2017 | |
| WO | 2012160707 | A1 | | 11/2012 | |
| WO | 2014104234 | A1 | | 7/2014 | |
| WO | 2021142891 | A1 | | 7/2021 | |

OTHER PUBLICATIONS

Marrero-López, D., et al. Synthesis and characterization of La2Mo2O9 obtained from freeze-dried precursors. Journal of Solid State Chemistry 177.7 (2004): 2378-2386. p. 2378; par. 2 and p. 2379; par. 3 and p. 2378; par. 3 (Year: 2004).*
CN 108878794 A-Machine translation, retrieved on Dec. 2025 (Year: 2025).*
JP 2012129166 A-Machine translation, retrieved on Dec. 2025 (Year: 2025).*
CN 108878794 A-Machine translation, retrieved in Dec. 2025 (Year: 2025).*
The international search report received in the corresponding international application PCT/CN2022/097507, mailed Mar. 1, 2023.
The Notice of Reasons for Refusal received in the counterpart JP application 2024-503681, mailed on Mar. 5, 2025, 6 pages with English translation.
The extended European search report received in the corresponding European application 22942944.4, mailed on Aug. 6, 2024.
Notice of Allowance (with English Machine Translation), mailed Mar. 24, 2026, for corresponding Korean Patent Application Serial No. 10-2024-7001796.

* cited by examiner

*Primary Examiner* — James M Erwin
*Assistant Examiner* — Gilberto Ramos Rivera
(74) *Attorney, Agent, or Firm* — K&L Gates LLP

(57) ABSTRACT

This application relates to a positive active material, a method for preparing same, an electrode plate, a secondary battery, and an electrical device. The positive active material includes: a core material, including a lithium-rich manganese-based positive electrode material; and a cladding layer, covering an outer surface of the core material, where the cladding layer includes an oxygen-ion conductor and a lithium-ion conductor.

19 Claims, 3 Drawing Sheets

POSITIVE ACTIVE MATERIAL, METHOD FOR PREPARING SAME, ELECTRODE PLATE, SECONDARY BATTERY, AND ELECTRICAL DEVICE

CROSS REFERENCE TO RELATED APPLICATION

The present application is a continuation of International Application PCT/CN2022/097507, filed on Jun. 8, 2022 and entitled "POSITIVE ACTIVE MATERIAL, METHOD FOR PREPARING SAME, ELECTRODE PLATE, SECONDARY BATTERY, AND ELECTRICAL DEVICE", which is incorporated in its entirety herein by reference.

TECHNICAL FIELD

This application relates to the technical field of secondary batteries, and in particular, to a positive active material, a method for preparing same, an electrode plate, a secondary battery, and an electrical device.

BACKGROUND

Secondary batteries are widely used in various consumer electronic products and electric vehicles by virtue of outstanding features such as a light weight, no pollution, and no memory effect.

With the elevation of requirements on the energy density of power batteries, numerous positive electrode materials have been developed. For example, a high-nickel ternary positive electrode material is of a relatively high energy density, but imposes extremely strict requirements on the preparation technique and the storage environment. In contrast, as a highly anticipated positive electrode material, a lithium-rich manganese-based positive electrode material exhibits a relatively high discharge specific capacity that is almost twice that of lithium iron phosphate, and is cost-effective due to the manganese contained. However, the initial discharge efficiency, cycle performance, and rate performance of the lithium-rich manganese-based positive electrode material are relatively low, thereby greatly hindering practical applications of the material.

SUMMARY

In view of the technical problems described in the background, this application provides a positive active material. The positive active material is applied to a secondary battery and can improve the initial discharge efficiency, cycle performance, and rate performance of the secondary battery.

To achieve the above objective, a first aspect of this application provides a positive active material, including:

- a core material, including a lithium-rich manganese-based positive electrode material; and
- a cladding layer, covering an outer surface of the core material, where the cladding layer includes an oxygen-ion conductor and a lithium-ion conductor.

Compared with the prior art, this application achieves at least the following beneficial effects:

In the positive active material according to this application, a cladding layer that contains both the oxygen-ion conductor and the lithium-ion conductor is formed on the outer surface of the core material containing the lithium-rich manganese-based positive electrode material. The oxygen-ion conductor and the lithium-ion conductor are synergistically introduced as a cladding layer of the core material that contains the lithium-rich manganese-based positive electrode material. Relatively concentrated oxygen vacancies exist inside the oxygen-ion conductor, and are highly capable of absorbing and storing oxygen, thereby effectively suppressing the release of lithium-rich manganese-based lattice oxygen, reducing extraction of lithium ions, and in turn, improving the first-cycle Coulombic efficiency of the positive active material. In addition, the oxygen release from the lattice of the lithium-rich manganese-based positive electrode material is suppressed, and the structural stability of the lithium-rich manganese-based positive electrode material is enhanced, thereby improving the cycle stability of the positive active material. In addition, the introduced lithium-ion conductor exhibits relatively high ionic conductivity, improves the transmission rate of lithium ions, reduces the extraction of lithium ions, and in turn, improves the capacity and rate performance of the positive active material.

In any embodiment of this application, the oxygen-ion conductor includes at least one of $La_2Mo_2O_9$ or a fluorite-type oxygen-ion conductor.

In any embodiment of this application, the fluorite-type oxygen-ion conductor includes at least one of $ZrO_2$, $CeO_2$, or $GeO_2$.

In any embodiment of this application, the lithium-ion conductor includes at least one of $LiLaO_2$, $Li_2MoO_4$, $Li_3PO_4$, $Li_3BO_3$, or $LiTaO_3$.

In any embodiment of this application, the oxygen-ion conductor includes $La_2Mo_2O_9$, and the lithium-ion conductor includes $LiLaO_2$ and $Li_2MoO_4$.

In any embodiment of this application, a molar ratio between a lanthanum atom and a molybdenum atom in the cladding layer is 1:(1.02 to 1.1), and optionally 1:(1.02 to 1.05).

In any embodiment of this application, a content of a molybdenum atom in the cladding layer is 300 ppm to 5000 ppm; and/or

- a content of a lanthanum atom in the cladding layer is 500 ppm to 5000 ppm.

In any embodiment of this application, a content of a molybdenum atom in the cladding layer is 1000 ppm to 4000 ppm; and/or

- a content of a lanthanum atom in the cladding layer is 1000 ppm to 3000 ppm.

In any embodiment of this application, a surface of the core material is doped with a lanthanum atom and a molybdenum atom.

In any embodiment of this application, a thickness of the surface of the core material doped with the lanthanum atom and the molybdenum atom is not greater than 3 μm, and optionally not greater than 2 μm.

In any embodiment of this application, a thickness of the cladding layer is 0.01 to 4 μm.

In any embodiment of this application, a thickness of the cladding layer is 0.02 to 1 μm.

In any embodiment of this application, a peak intensity ratio between $IO_2^{2-}$ and $IO^{2-}$ in the cladding layer is 0.5 to 1, and optionally 0.7 to 0.9.

$IO_2^{2-}$ is a peak intensity value of an oxygen vacancy corresponding to 531 eV in an X-ray photoelectron spectroscopy test, and $IO^{2-}$ is a peak intensity value of lattice oxygen corresponding to 529 eV in the X-ray photoelectron spectroscopy test.

In any embodiment of this application, a molecular formula of the lithium-rich manganese-based positive electrode material is $xLi_2MnO_3\cdot(1\text{-}x)LiNi_yCo_zMn_aM_{1\text{-}y\text{-}z\text{-}a}O_2$.

In the molecular formula above, $0<x<1$, $0\leq y\leq 1$, $0\leq z\leq 1$, $0\leq a\leq 1$, $0<y+z+a\leq 1$; and M is at least one of Mg, B, Al, V, Ti, Zr, Sn, or Mo.

In any embodiment of this application, a particle type of the lithium-rich manganese-based positive electrode material is a secondary particle, a single crystal, or a quasi-single crystal; and/or a specific surface area of the lithium-rich manganese-based positive electrode material is less than 2.0 $m^2/g$, and optionally is 0.1 to 1 $m^2/g$; and a $Dv_{50}$ particle diameter of the lithium-rich manganese-based positive electrode material is 1 to 20 μm, and optionally 3 to 15 μm.

A second aspect of this application provides a method for preparing the negative active material according to the first aspect of the present invention. The preparation method includes the following step:

forming the cladding layer on a surface of the core material.

In any embodiment of this application, the oxygen-ion conductor includes $La_2Mo_2O_9$. The lithium-ion conductor includes $LiLaO_2$ and $Li_2MoO_4$. The preparation method includes the following steps:

mixing a molybdenum salt, a lanthanum salt, and a lithium-rich manganese-based precursor in a solvent, and performing a hydrothermal reaction at 100° C. to 200° C. for 8 to 12 hours to obtain a lithium-rich manganese-based precursor, where, $La_2Mo_2O_9$ is deposited in situ on a surface of the precursor; and mixing a lithium salt with the lithium-rich manganese-based precursor containing the $La_2Mo_2O_9$ deposited in situ on the surface, and then calcining the mixture to obtain a positive active material compositely coated with the oxygen-ion conductor and the lithium-ion conductor.

In any embodiment of this application, the lithium-rich manganese-based precursor is $Ni_bCo_cMn_dM_{(1-b-c-d)}(OH)_2$.

In molecular formula above, $0<b<0.4$, $0\leq c\leq 0.05$, $0.6\leq d<1$, and M is at least one of Mg, B, Al, V, Ti, Zr, Sn, or Mo.

In any embodiment of this application, the solvent is at least one of water, ethanol, methanol, or ethylene glycol; and/or the molybdenum salt is at least one of ammonium molybdate, sodium molybdate, or potassium molybdate; and/or the lanthanum salt is at least one of lanthanum chloride or lanthanum nitrate; and/or the lithium salt is at least one of lithium carbonate, lithium hydroxide, or lithium acetate; and/or a molar ratio between lithium in the lithium salt and all metal elements in the lithium-rich manganese-based precursor containing the $La_2Mo_2O_9$ deposited in situ on the surface is 1:(1.1 to 1.8), and optionally 1:(1.1 to 1.5); and/or a pH value of the hydrothermal reaction is 8 to 10; and/or an atmosphere for the calcination is air; and/or the calcination includes steps of: pre-calcining at 300° C. to 500° C. for 2 to 5 hours, and then sintering at 700° C. to 900° C. for 10 to 20 hours.

A third aspect of this application provides a positive electrode plate, including:

a positive current collector; and a positive active material layer, where the positive active material layer is located on a surface of the positive current collector, and ingredients of the positive active material layer include the positive active material according to the first aspect of this application or a positive active material prepared by the preparation method according to the second aspect of this application.

A fourth aspect of this application provides a secondary battery. The secondary battery includes the positive electrode plate according to the third aspect of this application.

A fifth aspect of this application provides an electrical device. The electrical device includes the secondary battery according to the fourth aspect of this application.

BRIEF DESCRIPTION OF DRAWINGS

To describe the technical solutions of this application more clearly, the following outlines the drawings to be used in this application. Evidently, the drawings outlined below are merely a part of embodiments of this application. A person of ordinary skill in the art may derive other drawings from such drawings without making any creative efforts.

LIST OF REFERENCE NUMERALS

Figure 1:
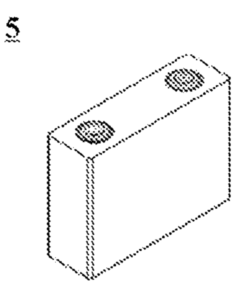
FIG. 1 is a schematic diagram of a secondary battery according to an embodiment.

1. battery pack; 2. upper box; 3. lower box; 4. battery module; 5. secondary battery; 51. housing; 52. electrode assembly; 53. cover plate; 6. electrical device.

DETAILED DESCRIPTION OF EMBODIMENTS

The following describes this application in more detail with reference to specific embodiments. Understandably, the specific embodiments are merely intended to illustrate this application but not intended to limit the scope of this application.

For brevity, some specific numerical ranges are disclosed herein for illustrative purpose only. However, any lower limit may be combined with any upper limit to form an unspecified range, any lower limit may be combined with any other lower limit to form an unspecified range, and any upper limit may be combined with any other upper limit to form an unspecified range. In addition, each separately disclosed point or single numerical value may be used as a lower limit or upper limit to combine with any other point or other single numerical value or with any other lower or upper limit to form an unspecified range.

It is hereby noted that in the description herein, unless otherwise specified, a range defined by a numerical value qualified by "at least" or "at most" includes this numerical value, and the word "more" in the phrase "one or more of" means at least two.

In the description herein, unless otherwise specified, the term "or" is inclusive. In other words, the expression "A or B" means "A alone, B alone, or both A and B". More specifically, all and any of the following conditions satisfy the condition "A or B": A is true (or existent) and B is false (or absent); A is false (or absent) and B is true (or existent); and, both A and B are true (or existent). Unless otherwise specified, the terms used in this application have the well-known meanings commonly understood by a person skilled in the art. Unless otherwise specified, the value of a parameter mentioned in this application may be measured by using a measurement method commonly used in the art (for example, may be tested according to the method described in an embodiment of this application).

Secondary Battery

A secondary battery is a battery that is reusable through activation of an active material in the battery by charging the battery that has been discharged.

Generally, a secondary battery includes a positive electrode plate, a negative electrode plate, a separator, and an electrolyte. In a charge-and-discharge cycle of the battery, active ions are shuttled between the positive electrode plate and the negative electrode plate by intercalation and deintercalation. The separator is disposed between the positive electrode plate and the negative electrode plate to serve an isolation purpose. The electrolyte serves to conduct ions between the positive electrode plate and the negative electrode plate.

Positive Electrode Plate

In a secondary battery, the positive electrode plate typically includes a positive current collector and a positive active material layer disposed on the positive current collector. The positive active material layer includes a positive active material.

The positive current collector may be a conventional metal foil or a composite current collector. The composite current collector may be formed by disposing a metal material on a polymer substrate. As an example, the positive current collector may be an aluminum foil.

As mentioned in the background, the lithium-rich manganese-based positive electrode material exhibits a relatively high discharge specific capacity, but the initial discharge efficiency, cycle performance, and rate performance of the lithium-rich manganese-based positive electrode material are relatively low, thereby greatly hindering practical applications of the material.

The technicians of this application have found through a lot of research that when the lithium-rich manganese-based positive electrode material is in a state of charging at a voltage of 4.5 V or above in a first cycle, the lithium-rich manganese-based positive electrode material is prone to release oxygen. In addition, some lithium ions in a transition metal layer are extracted together with $O^{2-}$ to form $Li_2O$. Crystal vacancies formed in this way can hardly accept lithium ions in a subsequent charge-and-discharge process, resulting in a decrease in the first-cycle Coulombic efficiency of lithium-rich manganese-based positive electrode material. At the same time, a large number of oxygen vacancies are formed inside the lithium-rich manganese-based positive electrode material, thereby being prone to cause migration of transition metal ions in the lithium-rich manganese-based positive electrode material. Consequently, the crystal structure is rearranged and the structure of the lithium-rich manganese-based positive electrode material becomes unstable, thereby deteriorating the cycle performance. In addition, the lithium-rich manganese-based positive electrode is of a low electronic and ionic conductivity, and side reactions increase sharply between the surface of the lithium-rich manganese-based positive electrode and an electrolyte solution at a high voltage, thereby causing very poor rate performance of the lithium-rich manganese-based positive electrode.

In view of this, an embodiment of this application provides a positive active material. The positive active material includes a core material and a cladding layer. The core material includes a lithium-rich manganese-based positive electrode material. The cladding layer covers an outer surface of the core material. The cladding layer includes an oxygen-ion conductor and a lithium-ion conductor.

Without being limited to any theory, in the positive active material according to this application, a cladding layer that contains both the oxygen-ion conductor and the lithium-ion conductor is formed on the outer surface of the core material containing the lithium-rich manganese-based positive electrode material. The oxygen-ion conductor and the lithium-ion conductor are synergistically introduced as a cladding layer of the core material that contains the lithium-rich manganese-based positive electrode material. Relatively concentrated oxygen vacancies exist inside the oxygen-ion conductor, and are highly capable of absorbing and storing oxygen, thereby effectively suppressing the release of lithium-rich manganese-based lattice oxygen, reducing extraction of lithium ions, and in turn, improving the first-cycle Coulombic efficiency of the positive active material. In addition, the oxygen release from the lattice of the lithium-rich manganese-based positive electrode material is suppressed, and the structural stability of the lithium-rich manganese-based positive electrode material is enhanced, thereby improving the cycle stability of the positive active material. In addition, the introduced lithium-ion conductor exhibits relatively high ionic conductivity, improves the transmission rate of lithium ions, reduces the extraction of lithium ions, and in turn, improves the capacity and rate performance of the positive active material.

In the above positive electrode plate, the ingredients of the positive active material layer include the cladding positive active material.

The technicians of this application have found through in-depth research that the performance of the secondary battery can be further improved if the positive active material of this application further optionally satisfies one or more of the following conditions in addition to the above design conditions.

In some embodiments, the oxygen-ion conductor includes, but is not limited to, at least one of $La_2Mo_2O_9$ or a fluorite-type oxygen-ion conductor. Further, the fluorite-type oxygen-ion conductor includes at least one of $ZrO_2$, $CeO_2$, or $GeO_2$.

In some embodiments, the lithium-ion conductor includes, but is not limited to, at least one of $LiLaO_2$, $Li_2MoO_4$, $Li_3PO_4$, $Li_3BO_3$, or $LiTaO_3$.

In some embodiments, the lithium-ion conductor includes $LiLaO_2$ and $Li_2MoO_4$. The combination of two specified lithium-ion conductors can significantly improve the ionic conductivity of the positive electrode material and effectively suppress cation mixing and dissolution of $Mn^{3+}$. In some embodiments, the oxygen-ion conductor includes $La_2Mo_2O_9$, and the lithium-ion conductor includes $LiLaO_2$ and $Li_2MoO_4$. The oxygen-ion conductor and the lithium-ion conductor include the same elements. Combined in such a specified manner, the oxygen-ion conductor is well compatible with the lithium-ion conductor, and the oxygen-ion conductor and the lithium-ion conductor in the cladding layer can be bonded more closely, thereby improving the stability of the cladding layer and the rapid conduction of ions.

Further, a molar ratio between a lanthanum atom and a molybdenum atom in the cladding layer is 1:(1.02 to 1.1), and preferably 1:(1.02 to 1.05). By controlling the molar ratio between molybdenum and lanthanum in the cladding layer, it is ensured that the lanthanum molybdate at the specified stoichiometric ratio can be synthesized.

Further, the content of the molybdenum atom in the cladding layer is 300 ppm to 5000 ppm, and optionally 1000 ppm to 4000 ppm. Further, the content of the lanthanum atom in the cladding layer is 500 ppm to 5000 ppm, and optionally 1000 ppm to 3000 ppm. By controlling the content of molybdenum atoms and lanthanum atoms in the cladding layer, it is ensured that the cladding layer is not too thick to exert the capacity of the positive active material, so as to achieve a good cladding effect.

Understandably, when $La_2Mo_2O_9$ is formed in situ on the surface of the core material, the surface of the core material will be doped with lanthanum atoms and molybdenum atoms. Further, a thickness of the surface of the core material doped with the lanthanum atom and the molybdenum atom is not greater than 3 μm, and optionally not greater than 2 μm. Further optionally, the thickness of the surface of the core material doped with the lanthanum atom and the molybdenum atom is not greater than 1 μm. For example, the doping thickness is 0.1 μm to 1 μm, or 0.1 μm to 0.6 μm.

In some embodiments, the thickness of the cladding layer is 0.01 to 4 μm, for example, 0.01 μm, 0.1 μm, 0.2 μm, 0.3 μm, 0.4 μm, 0.5 μm, 0.6 μm, 0.7 μm, 0.8 μm, 0.9 μm, 1 μm, 2 μm, 3 μm, or 4 μm. Preferably, the thickness of the cladding layer falls within the specified range, so as to avoid an excessive or deficient thickness of the cladding layer. The excessive thickness impairs the ion conductivity and cladding uniformity of the core material, and in turn, leads to a problem of a reduced capacity of the positive active material. The deficient thickness of the cladding layer leads to a problem of insignificant effect of improvement. The appropriate thickness further improves the initial discharge efficiency, cycle performance, and rate performance of the positive active material.

Optionally, the thickness of the cladding layer is 0.01 to 1 μm, and further optionally 0.02 to 0.5 μm. For example, when the oxygen-ion conductor includes $La_2Mo_2O_9$ and the lithium-ion conductor includes $LiLaO_2$ and $Li_2MoO_4$, the thickness of the cladding layer is optionally 0.01 to 1 μm, and further optionally 0.02 to 0.5 μm. In some embodiments, a peak intensity ratio between $IO_2^{2-}$ and $IO^{2-}$ in the cladding layer is 0.5 to 1, and optionally 0.7 to 0.9, where $IO_2^{2-}$ is a peak intensity value of an oxygen vacancy corresponding to 531 eV in an X-ray photoelectron spectroscopy test, and $IO^{2-}$ is a peak intensity value of lattice oxygen corresponding to 529 eV in the X-ray photoelectron spectroscopy test. By controlling the peak intensity ratio between $IO_2^{2-}$ and $IO^{2-}$ in the cladding layer to fall within the specified range, the cladding layer includes an appropriate amount of oxygen vacancies, and can effectively suppress the release of oxygen from the material, improve stability of the structure of the lithium-rich manganese-based positive electrode material in the positive active material, and suppress the phase transition of the lithium-rich manganese-based positive electrode material.

In some embodiments, a molecular formula of the lithium-rich manganese-based positive electrode material is $xLi_2MnO_3\cdot(1-x)LiNi_yCo_zMn_aM_{1-y-z-a}O_2$.

In the molecular formula above, $0<x<1$, $0\leq y\leq 1$, $0\leq z\leq 1$, $0\leq a\leq 1$, $0<y+z+a\leq 1$; and M is at least one of Mg, B, Al, V, Ti, Zr, Sn, or Mo. The above cladding layer is applicable to the lithium-rich manganese-based positive electrode material to improve the initial discharge efficiency, cycle performance, and rate performance of the lithium-rich manganese-based positive electrode material.

Optionally, the lithium-rich manganese-based positive electrode material includes, but is not limited to, the following types:

$$0.35Li_2MnO_3\cdot0.65LiNi_{0.45}Co_{0.08}Mn_{0.46}O_2,$$

$$0.35Li_2MnO_3\cdot0.65LiNi_{0.45}Co_{0.08}Mn_{0.46}Mg_{0.01}O_2,$$

$$0.35Li_2MnO_3\cdot0.65LiNi_{0.45}Co_{0.08}Mn_{0.46}Al_{0.01}O_2,$$

$$0.35Li_2MnO_3\cdot0.65LiNi_{0.45}Co_{0.08}Mn_{0.46}Ti_{0.01}O_2,$$

and $$0.35Li_2MnO_3\cdot0.65LiNi_{0.45}Co_{0.08}Mn_{0.46}V_{0.01}O_2.$$

Understandably, in some embodiments, the core material is the lithium-rich manganese-based positive electrode material. In some other embodiments, the core material may include other positive electrode materials commonly used in the art in addition to the above lithium-rich manganese-based positive electrode material.

In some embodiments, a particle type of the lithium-rich manganese-based positive electrode material is a secondary particle, a single crystal, or a quasi-single crystal. The secondary particle means a secondary spherical particle formed by agglomeration of primary particles.

In some embodiments, a specific surface area of the lithium-rich manganese-based positive electrode material is less than 2.0 $m^2/g$, and optionally is 0.1 to 1 $m^2/g$.

In some embodiments, a $Dv_{50}$ particle diameter of the lithium-rich manganese-based positive electrode material is 1 to 20 μm, and optionally 3 to 15 μm.

The lithium-rich manganese-based positive electrode material used in the core material of this application is characterized by a regular morphology, uniform particle size distribution, and a relatively small specific surface area, thereby achieving a relatively high compaction density and ensuring a relatively high energy density and excellent cycle performance of the prepared secondary battery.

The positive active material generally optionally includes a binder, a conductive agent, and other optional additives.

As an example, the conductive agent may be one or more of superconductive carbon, acetylene black, carbon black, Ketjen black, carbon dots, carbon nanotubes, Super P (SP), graphene, and carbon nanofibers.

As an example, the binder may be one or more of styrene-butadiene rubber (SBR), water-based acrylic resin (water-based acrylic resin), polyvinylidene difluoride (PVDF), polytetrafluoroethylene (PTFE), poly(ethylene-co-vinyl acetate) (EVA), polyacrylic acid (PAA), carboxymethyl cellulose (CMC), polyvinyl alcohol (PVA), or polyvinyl butyral (PVB).

This application further provides a method for preparing the positive active material, including the following step: forming the cladding layer on a surface of the core material.

Understandably, the method for forming the cladding layer may be based on common techniques in the art, such as a solid-phase coating method, a spray method, and an in-situ deposition method.

In some embodiments, the oxygen-ion conductor includes $La_2Mo_2O_9$, and the lithium-ion conductor includes $LiLaO_2$ and $Li_2MoO_4$. Preferably, the preparation method includes the following steps S11 to S12.

Step S11: Mix a molybdenum salt, a lanthanum salt, and a lithium-rich manganese-based precursor in a solvent, and perform a hydrothermal reaction at 100° C. to 200° C. for 8 to 12 hours to obtain a lithium-rich manganese-based precursor, where, $La_2Mo_2O_9$ is deposited in situ on a surface of the precursor.

Step S12: Mix a lithium salt with the lithium-rich manganese-based precursor containing the $La_2Mo_2O_9$ deposited in situ on the surface, and then calcine the mixture to obtain a positive active material compositely coated with the oxygen-ion conductor and the lithium-ion conductor.

In this way, through the calcination in step S12, on the one hand, a part of $La_2Mo_2O_9$ reacts with a part of the lithium salt to form $LiLaO_2$ and $Li_2MoO_4$ that serve as lithium-ion conductors. A part of $La_2Mo_2O_9$ remains as an oxygen-ion conductor. On the other hand, the lithium-rich manganese-based precursor can be caused to react with the lithium salt, so as to be converted into a lithium-rich manganese-based positive electrode material. In addition, some lanthanum and molybdenum metal ions in $La_2Mo_2O_9$ serve to dope and enter the superficial layer of the lithium-rich manganese-based positive electrode material.

The preparation method according to this application can synthesize a lithium-rich manganese-based material compositely coated with an oxygen-ion conductor and a lithium-ion conductor. In the material, the oxygen-ion conductor includes $La_2Mo_2O_9$, and the lithium-ion conductor includes $LiLaO_2$ and $Li_2MoO_4$, thereby achieving excellent initial discharge efficiency, cycle performance, and rate performance of the positive active material.

In some embodiments, the lithium-rich manganese-based precursor is $Ni_bCo_cMn_dM_{(1-b-c-d)}(OH)_2$.

In the molecular formula above, $0<b<0.4$, $0\leq c\leq 0.05$, $0.6\leq d<1$, and M is at least one of Mg, B, Al, V, Ti, Zr, Sn, or Mo. In the lithium-rich manganese-based precursor, the content of Mn is relatively high, and the content of Co is relatively low, thereby being cost-effective. In the foregoing preparation process, the lithium-rich manganese-based precursor may be doped so that the doping metal ions can be conveniently added into the lattice in a sintering process, thereby improve the structural stability of the positive active material.

Optionally, the lithium-rich manganese-based precursor includes, but is not limited to, the following types:

$$Ni_{0.30}Co_{0.05}Mn_{0.65}(OH)_2,$$

$$Ni_{0.29}Co_{0.05}Mn_{0.65}Mg_{0.01}(OH)_2,$$

$$Ni_{0.29}Co_{0.05}Mn_{0.65}Al_{0.01}(OH)_2,$$

$$Ni_{0.29}Co_{0.05}Mn_{0.65}Ti_{0.01}(OH)_2,$$

and $$Ni_{0.29}Co_{0.05}Mn_{0.65}V_{0.01}(OH)_2.$$

In some embodiments, the solvent is at least one of water, ethanol, methanol, or ethylene glycol.

In some embodiments, the molybdenum salt is at least one of ammonium molybdate, sodium molybdate, or potassium molybdate.

In some embodiments, the lanthanum salt is at least one of lanthanum chloride or lanthanum nitrate.

In some embodiments, the lithium salt is at least one of lithium carbonate, lithium hydroxide, or lithium acetate.

Further, in step S12, a molar ratio between lithium in the lithium salt and all metal elements in the lithium-rich manganese-based precursor containing the $La_2Mo_2O_9$ deposited in situ on the surface is 1:(1.1 to 1.8), and optionally 1:(1.1 to 1.5). The entirety of all the metal elements includes Ni, Co, Mn, M, Mo, and La. In this way, it is ensured that the lithium salt added in step S12 can not only satisfy the lithium required for the lithium-rich manganese-based precursor to form the lithium-rich manganese-based positive electrode material, but also satisfy the lithium required for the $La_2Mo_2O_9$ on the surface to react partially to form $LiLaO_2$ and $Li_2MoO_4$.

Further, a pH value of the hydrothermal reaction is 8 to 10.

Further, an atmosphere for the calcination is air.

Further, the calcination includes steps of: pre-calcining at 300° C. to 500° C. for 2 to 5 hours, and then sintering at 700° C. to 900° C. for 10 to 20 hours.

Through the above preparation method, the manufacturing process is simple, and the initial discharge efficiency, cycle performance, and rate performance of the prepared positive active material are superior.

Negative Electrode Plate

In a secondary battery, the negative electrode plate typically includes a negative current collector and a negative active material layer disposed on the negative current collector. The negative active material layer includes a negative active material.

The negative current collector may be a conventional metal foil or a composite current collector. For example, the composite current collector by be formed by disposing a metal material on a polymer substrate. As an example, the negative current collector may be a copper foil.

Commonly used negative active materials include, but are not limited to, one or more of artificial graphite, natural graphite, hard carbon, soft carbon, a silicon-based material, or a tin-based material. The silicon-based material may be one or more selected from simple-substance silicon, a silicon-oxygen compound (such as silicon suboxide), a silicon-carbon composite, a silicon-nitrogen composite, or a silicon alloy. The tin-based material may be one or more selected from simple-substance tin, tin-oxygen compound, or tin alloy. Such materials are all commercially available. In some embodiments, in order to further increase the energy density of the battery, the negative active material includes a silicon-based material.

Separator

In some embodiments, the secondary battery further includes a separator. The type of the separator is not particularly limited in this application, and may be any well-known porous separator that is highly stable both chemically and mechanically.

In some embodiments, the separator may be made of a material that is at least one selected from glass fiber, non-woven fabric, polyethylene, polypropylene, and polyvinylidene difluoride. The separator may be a single-layer film or a multilayer composite film, without being particularly limited. When the separator is a multilayer composite film, materials in different layers may be identical or different, without being particularly limited.

Electrolyte Solution

The secondary battery may include an electrolyte solution. The electrolyte solution serves to conduct ions between the positive electrode and the negative electrode. The electrolyte solution may include an electrolyte salt and a solvent.

As an example, the electrolyte salt may be one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluoro(oxalato) borate (LiDFOB), lithium bis(oxalato)borate (LiBOB), lithium difluorophosphate ($LiPO_2F_2$), lithium difluoro(bisoxalato)phosphate (LiDFOP), or lithium tetrafluoro(oxalato)phosphate (LiTFOP).

As an example, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl)ethane (ESE).

In some embodiments, the electrolyte solution further includes an additive. For example, the additive may include a negative film-forming additive, a positive film-forming additive, and additives that can improve some performance of the battery, for example, an additive that improves overcharge performance of the battery, an additive that improves high-temperature performance of the battery, and an additive that improves low-temperature performance of the battery, and the like.

In some embodiments, the secondary battery of this application is a lithium-ion secondary battery.

The secondary battery may be prepared by a conventional method in this field. For example, the method for preparing a secondary battery includes: sequentially winding (or stacking) a positive electrode plate, a separator, and a negative electrode plate to obtain a battery cell, where the separator is located between the positive electrode plate and the negative electrode plate to serve a separation function; and then placing the battery cell into an outer package, injecting an electrolyte solution, and performing sealing to obtain a secondary battery.

The shape of the secondary battery is not particularly limited in this application, and may be cylindrical, prismatic, or any other shape. FIG. 1 shows a prismatic secondary battery 5 as an example.

In some embodiments, the secondary battery may include an outer package. The outer package is configured to package the positive electrode plate, the negative electrode plate, and the electrolyte solution.

Figure 2:
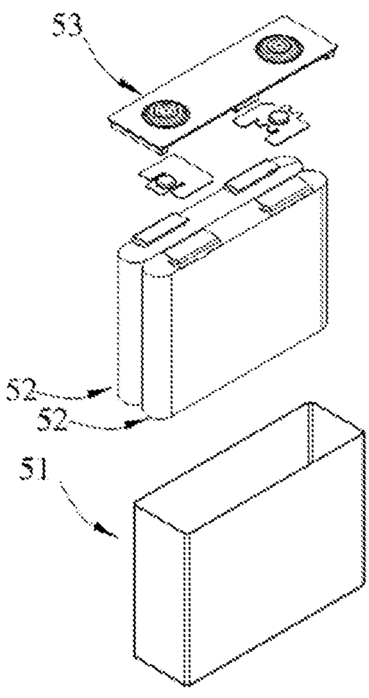
FIG. 2 is an exploded view of FIG. 1.

In some embodiments, referring to FIG. 2, the outer package may include a housing body 51 and a cover plate 53. The housing 51 may include a bottom plate and a side plate connected to the bottom plate. The bottom plate and the side plate close in to form an accommodation cavity. An opening that communicates with the accommodation cavity is made on the housing 51. The cover plate 53 can fit and cover the opening to close the accommodation cavity.

The positive electrode plate, the negative electrode plate, and the separator may be made into the electrode assembly 52 by winding or stacking. The electrode assembly 52 is packaged in the accommodation cavity. The electrolyte solution infiltrates in the electrode assembly 52. The number of electrode assemblies 52 in the secondary battery 5 may be one or more, and is adjustable as required.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The material of the soft package may be plastic such as one or more of polypropylene (PP), polybutylene terephthalate (PBT), or polybutylene succinate (PBS).

In some embodiments, the secondary battery may be assembled to form a battery module. The battery module may contain a plurality of secondary batteries, and the specific number of the secondary batteries in a battery module may be adjusted according to practical applications and capacity of the battery module.

Figure 3:
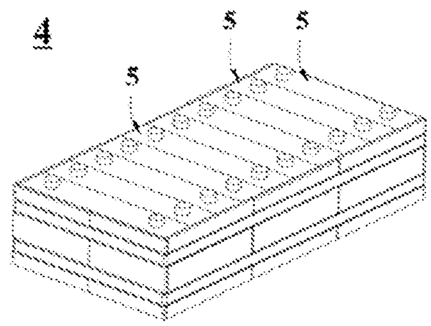
FIG. 3 is a schematic diagram of a battery module according to an embodiment.

FIG. 3 shows a battery module 4 as an example. In the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery module may be assembled to form a battery pack. The number of the battery modules contained in a battery pack may be adjusted according to practical applications and the capacity of the battery pack.

Figure 4:
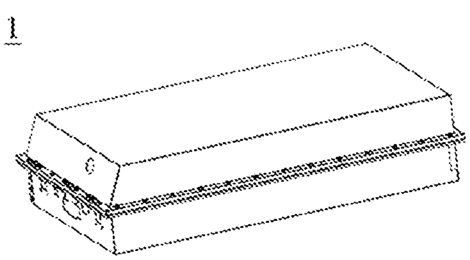
FIG. 4 is a schematic diagram of a battery pack according to an embodiment.
Figure 5:
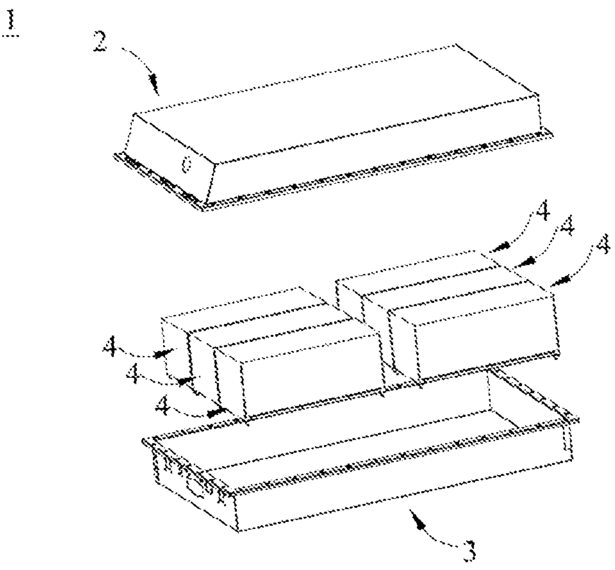
FIG. 5 is an exploded view of FIG. 4.

FIG. 4 and FIG. 5 show a battery pack 1 as an example. The battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Electrical Device

This application further provides an electrical device. The electrical device includes at least one of the secondary battery, the battery module, or the battery pack. The secondary battery, the battery module, or the battery pack may be used as a power supply of the electrical device, or used as an energy storage unit of the electrical device. The electrical device may be, but is not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, watercraft, a satellite system, or an energy storage system.

The secondary battery, battery module, or battery pack may be selected for use in the electrical device based on the use requirements of the electrical device.

Figure 6:
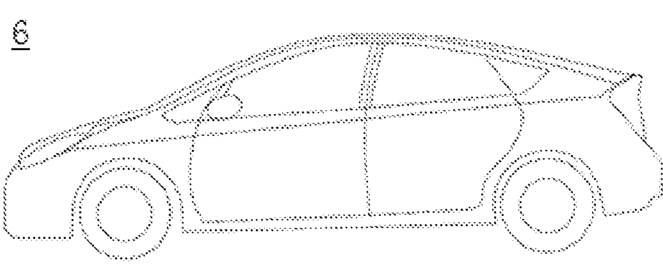
FIG. 6 is a schematic diagram of an electrical device using a secondary battery as a power supply according to an embodiment.

FIG. 6 shows a device as an example. The electrical device 6 may be battery electric vehicle, a hybrid electric vehicle, a plug-in hybrid electric vehicle, or the like. The electrical device may adopt a battery pack or a battery module in order to meet the requirements of the electrical device on a high power and a high energy density of the secondary battery.

In another example, the device may be a mobile phone, a tablet computer, a notebook computer, or the like. The device is generally required to be thin and light, and may have a secondary battery as a power supply.

The beneficial effects of this application are further described below with reference to embodiments.

Embodiments

To make the technical problems to be solved by this application, technical solutions, and beneficial effects of this application clearer, the following describes this application in further detail with reference to embodiments and drawings. Evidently, the described embodiments are merely a part of but not all of the embodiments of this application. The following description of at least one exemplary embodiment is merely illustrative, and is in no way intended as a limitation on this application or the use thereof. All other embodiments derived by a person of ordinary skill in the art based on the embodiments of this application without making any creative efforts still fall within the protection scope of this application.

All materials used in an embodiment of this application are commercially available.

I. Preparation of a Positive Active Material and Performance Test

1. Preparing a positive active material

Positive Active Materials 1 to 5

S1: Dispersing a lithium-rich manganese-based precursor in a solvent evenly, and then dissolving a molybdenum salt (ammonium molybdate) and a lanthanum salt (lanthanum nitrate) into the solvent separately to make a solution.

S2: Adding the molybdenum salt (ammonium molybdate) and lanthanum salt (lanthanum nitrate) solution in step S1 dropwise into a dispersion solution of the precursor under water bath conditions, and adjusting the pH of the dispersion solution to 9. Subsequently, stirring the solution at a room temperature for 4 hours, and then relocating the solution into a reaction vessel to undergo a hydrothermal reaction at a temperature of 100° C. to 200° ° C. for 8 to 12 hours. Depositing lanthanum molybdate ($La_2Mo_2O_9$) in situ onto the surface of the precursor after the reaction vessel cools down to a room temperature, where the lanthanum molybdate is formed from the molybdenum salt and the lanthanum salt.

S3: Washing, by using deionized water, the precursor product obtained in step S2, and vacuum-drying the product. Mixing the product with a lithium salt (lithium carbonate) through ball milling. Pre-calcining the product at a temperature of 300° C. to 500° C. for 2 hours, and then sintering the product at a high temperature of 700° C. to 900° C. for 10 to 20 hours. Naturally cooling the product to a room temperature to obtain a surface-coated lithium-rich manganese-based positive electrode material. The surface of the lithium-rich manganese-based positive electrode material is coated with a composite cladding layer compounded of an oxygen-ion conductor $La_2Mo_2O_9$ and lithium-ion conductors $LiLaO_2$ and $Li_2MoO_4$. Specific parameters are shown in Table 1.

Note: "Li/Me" in Table 1 means a molar ratio between lithium in the lithium salt (lithium carbonate) added in step S3 and all metal elements in the precursor product added in step S3. Understandably, the amount of substances of all metal elements in the precursor product added in step S3 can be obtained through an elemental test.

2. Performance Test of Positive Active Material

1) Determining the Molecular Structure and $Dv_{50}$ Particle Diameter of the Core Material $Dv_{50}$ means a particle diameter corresponding to a cumulative volume distribution percentage 50% in a volume-based particle size distribution. As an example, $Dv_{50}$ may be measured conveniently by using a laser particle size analyzer such as a Mastersizer 2000E laser particle size analyzer of Britain-based Malvern Instruments Ltd. with reference to the standard GB/T 19077-2016 Particle Size Analysis-Laser Diffraction Methods.

2) Measuring the Thickness of Molybdenum and Lanthanum Doped into the Core Material, Briefly Referred to as Doping Thickness in Table 1.

The thickness of molybdenum and lanthanum doped into the core material may be determined by the well-known elemental surface scan and line scan analysis of ion beam cross-section polisher (CP).

3) Testing the Molar Ratio Between La and Mo, the Content of La and Mo, and the Ratio of $IO_2^{2-}$ to $IO^{2-}$ of the Cladding Layer The molar ratio between La and Mo of the cladding layer, and the content of La and Mo, may be determined and analyzed through the well-known surface scan analysis with an X-ray energy dispersive spectrometer (EDS) and through inductively coupled plasma-atomic emission spectroscopy (ICP-AES), respectively. The ratio of $IO_2^{2-}$ to $IO^{2-}$ may be analyzed through the well-known X-ray photoelectron spectroscopy (XPS), where $IO_2^{2-}$ is a peak intensity value of an oxygen vacancy corresponding to 531 eV in an X-ray photoelectron spectroscopy test, and $IO^{2-}$ is a peak intensity value of lattice oxygen corresponding to 529 eV in the X-ray photoelectron spectroscopy test.

Some ingredients and performance test results of positive active materials 1 to 5 are shown in Table 1 below, In Table 1, the thickness of the cladding layer is the total thickness of all cladding layers.

TABLE 1

| | Item | Positive active material 1 | Positive active material 2 | Positive active material 3 |
|---|---|---|---|---|
| Preparation process | Molecular formula of precursor | $Ni_{0.30}Co_{0.05}Mn_{0.65}(OH)_2$ | $Ni_{0.29}Co_{0.05}Mn_{0.65}Mg_{0.01}(OH)_2$ | $Ni_{0.29}Co_{0.05}Mn_{0.65}Al_{0.01}(OH)_2$ |
| | Hydrothermal reaction | 150° C., 10 h | 200° C., 8 h | 100° C., 12 h |
| | Li/Me | 1.38 | 1.39 | 1.40 |
| | Pre-calcination | 400° C., 2 h | 500° C., 3 h | 300° C., 4 h |
| | High-temperature calcination | 800° C., 15 h | 900° C., 10 h | 700° C., 20 h |
| Core material | Type | Core material 1 | Core material 2 | Core material 3 |
| | $Dv_{50}$ particle diameter | 6 μm | 6 μm | 6.5 μm |
| | Doping thickness | 0.15 μm | 0.23 μm | 0.38 μm |
| Cladding layer | La:Mo | 1:1.02 | 1:1.03 | 1:1.04 |
| | Content of La | 500 ppm | 1500 ppm | 2000 ppm |

TABLE 1-continued

| | | | |
|---|---|---|---|
| Content of Mo | 350 ppm | 1036 ppm | 1390 ppm |
| Thickness | 0.1 μm | 0.26 μm | 0.35 μm |
| $IO_2^{2-}/IO^{2-}$ | 0.72 | 0.78 | 0.82 |

| Item | | Positive active material 4 | Positive active material 5 |
|---|---|---|---|
| Preparation process | Molecular formula of precursor | $Ni_{0.29}Co_{0.05}Mn_{0.65}Ti_{0.01}(OH)_2$ | $Ni_{0.29}Co_{0.05}Mn_{0.65}V_{0.01}(OH)_2$ |
| | Hydrothermal reaction | 150° C.,10 h | 150° C., 10 h |
| | Li/Me | 1.38 | 1.40 |
| | Pre-calcination | 400° C., 5 h | 400° C., 3 h |
| | High-temperature calcination | 800° C., 15 h | 800° C., 15 h |
| Core material | Type | Core material 4 | Core material 5 |
| | $Dv_{50}$ particle diameter | 7 μm | 7.5 μm |
| | Doping thickness | 0.45 μm | 0.56 μm |
| Cladding layer | La:Mo | 1:1.03 | 1:1.05 |
| | Content of La | 3000 ppm | 5000 ppm |
| | Content of Mo | 2080 ppm | 3460 ppm |
| | Thickness | 0.4 μm | 0.5 μm |
| | $IO_2^{2-}/IO^{2-}$ | 0.85 | 0.9 |

In Table 1 above, the core materials 1 to 5 are:

$0.35Li_2MnO_3 \cdot 0.65LiNi_{0.46}Co_{0.08}Mn_{0.46}O_2$, $0.35Li_2MnO_3 \cdot 0.65LiNi_{0.45}Co_{0.08}Mn_{0.46}Mg_{0.01}O2$, $0.35Li_2MnO_3 \cdot 0.65LiNi_{0.45}Co_{0.08}Mn_{0.46}Al_{0.01}O$, $0.35Li_2MnO_3 \cdot 0.65LiNi_{0.45}Co_{0.08}Mn_{0.46}Ti_{0.01}O_2$, $0.35Li_2MnO_3 \cdot 0.65LiNi_{0.45}Co_{0.08}Mn_{0.46}V_{0.01}O_2$.

Positive Active Material 6

Mixing the lithium-rich manganese-based positive electrode material $0.35Li_2MnO_3 \cdot 0.65LiNi_{0.45}Co_{0.08}Mn_{0.46}Al_{0.01}O_2$ with both an oxygen-ion conductor $La_2Mo_2O_9$ and a lithium-ion conductor $LiLaO_2$ in a solid phase. Pre-calcinating the mixture in a 400° C. air atmosphere for 2 hours, and then keeping the temperature at 800° ° C. for 12 hours to obtain a modified lithium-rich manganese-based positive electrode material.

The preparation method in Embodiments 7 to 13 is the same as that in Embodiment 6 except the ingredients changed as shown in Table 2.

Performance test results of positive active materials 6 to 13 are shown in Table 2 below:

TABLE 2

| Item | Core material $D_{v50}$ particle diameter (μm) | Cladding layer Oxygen-ion conductor | Lithium-ion conductor | Thickness | $IO_2^{2-}/IO^{2-}$ |
|---|---|---|---|---|---|
| Positive active material 3 | 6.5 | $La_2Mo_2O_9$ | $LiLaO_2$, $Li_2MoO_4$ | 460 nm | 0.82 |
| Positive active material 6 | 10.6 | $La_2Mo_2O_9$ | $LiLaO_2$ | 2.6 μm | 0.56 |
| Positive active material 7 | 10.8 | $La_2Mo_2O_9$ | $Li_2MoO_4$ | 3.5 μm | 0.62 |
| Positive active material 8 | 11.2 | $ZrO_2$ | $LiLaO_2$, $Li_2MoO_4$ | 2.6 μm | 0.43 |
| Positive active material 9 | 12.5 | $CeO_2$ | $Li_3PO_4$ | 3.8 μm | 0.56 |
| Positive active material 10 | 10.3 | $ZrO_2$ | $Li_3BO_3$ | 2.5 μm | 0.32 |

TABLE 2-continued

| Item | Core material $D_{v50}$ particle diameter (μm) | Cladding layer Oxygen-ion conductor | Lithium-ion conductor | Thickness | $IO_2^{2-}/IO^{2-}$ |
|---|---|---|---|---|---|
| Positive active material 11 | 10.6 | $GeO_2$ | $LiTaO_3$ | 2.3 μm | 0.45 |
| Positive active material 12 | 12.5 | — | $LiLaO_2$, $Li_2MoO_4$ | 1.5 μm | / |
| Positive active material 13 | 11.6 | $La_2Mo_2O_9$ | — | 1.3 μm | 0.54 |

II. Preparing a Positive Electrode Plate

Positive Electrode Plates 1 to 13

Mixing the positive active materials 1 to 13, the conductive carbon black (SP), and the polyvinylidene difluoride (PVDF) at a mass ratio of 96.8:2.2:1. Dissolving the mixture in N-methyl-pyrrolidone (NMP). Coagulating the mixture into a positive slurry. Applying the slurry onto an aluminum foil with a width of 400 mm. Performing drying, cold pressing, and cutting to obtain a positive electrode plate.

III. Preparing a Battery

1. Positive electrode plate: Using the positive electrode plates 1 to 13 prepared above.
2. Separator: Using a polyethylene (PE) porous polymer film as a separator.
3. Negative electrode plate: Stirring well graphite, a binder styrene-butadiene rubber (SBR), a binder polyacrylic acid (PAA), a dispersant (CMC-Na), conductive carbon black (Super-P, SP), and carbon nanotubes (CNT) in an appropriate amount of deionized water at a mass ratio of 95%:2%:1%:1%:0.7%:0.3% to make a negative slurry. Subsequently, applying the negative slurry onto a 6 μm-thick copper foil, performing drying and cold pressing to form a negative active material layer, and performing cutting to obtain a negative electrode plate.
4. Electrolyte solution: Mixing ethylene carbonate (EC), ethyl methyl carbonate (EMC), and diethyl carbonate (DEC) at a volume ratio of 3:6:1 to obtain a mixed organic solvent, and then dissolving a well-dried lithium salt ($LiPF_6$) at a concentration of 1 mol/L in the mixed organic solvent to obtain the required electrolytic solution.
5. Assembling a full battery: Stacking the positive electrode plate, the separator, and the negative electrode plate sequentially, placing the separator between the positive electrode and the negative electrode to serve a function of separation, and winding the stacked structure to obtain a bare cell. Placing the bare cell into an outer package aluminum housing, injecting the prepared electrolyte solution into a dry cell that has been dried at a high temperature, and performing steps such as vacuum packaging, standing, chemical formation, and shaping to obtain lithium-ion secondary batteries 1 to 13, as shown in Table 3.

IV. Evaluating Performance of the Battery

The performance evaluation of the batteries 1-13 is carried out by the following method.

1. Initial Discharge Efficiency

Charging the batteries 1-13 filled with the electrolyte solution at a constant current of 0.02 C at a temperature of 45° C. until the voltage reaches 3.4 V. Leaving the battery to stand for 5 minutes, and then charging the battery at a constant current of 0.1 C until the voltage reaches 3.75 V. Recording the capacity as $Z_1$. Subsequently, performing gas exhausting and second-time sealing. Putting the battery sealed for a second time into a 25° C. dry environment. Charging the battery at a constant current of 0.33 C until the voltage reaches 4.5 V, and then charging the battery at a constant voltage until of the current reaches 0.02 C. Leaving the battery to stand for 5 minutes, and recording the capacity as $Z_2$. Subsequently, discharging the battery at current of 0.33 C until the voltage reaches 2.0 V. Recording the capacity as $D_1$.

The first-cycle Coulombic efficiency is calculated as: first-cycle Coulombic efficiency=$D_1/(Z_1+Z_2)$.

2. Testing the Discharge Capacity

Charging the battery at a current of 0.33 C in a voltage range of 2.0 V to 4.5 V in a 25° C. constant-temperature environment until the voltage reaches 4.5 V, and then charging the battery at a constant voltage of 4.5 V until the current reaches 0.05 C. Leaving the battery to stand for 5 minutes, and then discharging the battery at a current of 0.33 C until the voltage reaches 2.0 V. Recording the capacity of the lithium-ion battery when the discharge rate is 0.33 C (referred to as 0.33 C discharge capacity). Leaving the battery to stand for 5 minutes, charging the battery at a current of 0.33 C until the voltage reaches 4.5 V, and then charging the battery at a constant voltage of 4.5 V until the current reaches 0.05 C. Leaving the battery to stand for 5 minutes, and then discharging the battery at a current of 0.5 C until the voltage reaches 2.0 V. Recording the capacity of the lithium-ion battery when the discharge rate is 0.5 C (referred to as 0.5 C discharge capacity).

3. Testing the Cycle Performance:

1) Performing a first charge-and-discharge cycle in a 25° C. constant-temperature environment. Charging the battery at a constant current of 0.5 C (a current at which the nominal capacity of the battery is fully discharged within 2 hours) until the voltage reaches an upper limit of 4.46 V, and then charging the battery at a constant voltage until the current reaches 0.05 C. Leaving the battery to stand for 5 minutes, and then discharging the battery at a constant current of 0.5 C until the voltage finally reaches 2.3 V. Recording the first-cycle discharge capacity. Subsequently, repeating the charge-and-discharge cycle continuously.

Calculating the capacity retention rate of a fully charged battery cycled at 25° C. at the end of the $500^{th}$ cycle, that is, $500^{th}$-cycle capacity retention rate=($500^{th}$-cycle discharge capacity/first-cycle discharge capacity)×100%.

2) Performing a first charge-and-discharge cycle in a 45° C. constant-temperature environment. Charging the battery at a constant current of 0.5 C (a current at which the nominal capacity of the battery is fully discharged within 2 hours) until the voltage reaches an upper limit of 4.46 V, and then charging the battery at a constant voltage until the current reaches 0.05 C. Leaving the battery to stand for 5 minutes, and then discharging the battery at a constant current of 0.5 C until the voltage finally reaches 2.3 V. Recording the first-cycle discharge capacity. Subsequently, repeating the charge-and-discharge cycle continuously.

Calculating the capacity retention rate of a fully charged battery cycled at 45° C. at the end of the $500^{th}$ cycle, that is, $500^{th}$-cycle capacity retention rate=($500^{th}$-cycle discharge capacity/first-cycle discharge capacity)×100%.

TABLE 3

| Group | Battery | Positive electrode plate | Initial discharge efficiency (%) | 0.33 C discharge capacity (mAh/g) | 0.5 C discharge capacity (mAh/g) | $500^{th}$-cycle capacity retention rate of fully charged battery cycled at 25° C. (%) | $500^{th}$-cycle capacity retention rate of fully charged battery cycled at 45° C. (%) |
|---|---|---|---|---|---|---|---|
| Embodiment 1 | Battery 1 | Positive electrode plate 1 | 87.6 | 228.6 | 217.5 | 95.2 | 93.6 |
| Embodiment 2 | Battery 2 | Positive electrode plate 2 | 88.3 | 230.5 | 218.5 | 96.3 | 94.2 |
| Embodiment 3 | Battery 3 | Positive electrode plate 3 | 90.5 | 235.6 | 225.5 | 98.5 | 96.2 |
| Embodiment 4 | Battery 4 | Positive electrode plate 4 | 87.6 | 228.5 | 216.8 | 95.3 | 92.8 |
| Embodiment 5 | Battery 5 | Positive electrode plate 5 | 86.8 | 225.6 | 210.3 | 94.6 | 91.2 |
| Embodiment 6 | Battery 6 | Positive electrode plate 6 | 80.5 | 210.6 | 195.3 | 85.6 | 83.2 |
| Embodiment 7 | Battery 7 | Positive electrode plate 7 | 78.5 | 205.2 | 190.2 | 87.6 | 85.3 |
| Embodiment 8 | Battery 8 | Positive electrode plate 8 | 75.3 | 202.3 | 188.2 | 84.3 | 82.6 |
| Embodiment 9 | Battery 9 | Positive electrode plate 9 | 78.6 | 204.3 | 189.2 | 86.5 | 84.2 |
| Embodiment 10 | Battery 10 | Positive electrode plate 10 | 76.2 | 203.2 | 187.6 | 85.2 | 83.2 |
| Embodiment 11 | Battery 11 | Positive electrode plate 11 | 72.6 | 200.5 | 185.2 | 82.3 | 80.3 |
| Comparative Embodiment 1 | Battery 12 | Positive electrode plate 12 | 70.5 | 195 | 181.2 | 75.8 | 73.2 |
| Comparative Embodiment 2 | Battery 13 | Positive electrode plate 13 | 70.6 | 190 | 176.2 | 73.2 | 70.8 |

As can be seen from Table 3, the cladding layer of the positive active material in Comparative Embodiment 1 contains no oxygen-ion conductor, the cladding layer of the positive active material in Comparative Embodiment 2 contains no lithium-ion conductor, but the cladding layer of the positive active material in each embodiment contains both an oxygen-ion conductor and a lithium-ion conductor. The initial discharge efficiency, cycle performance, and rate performance of the secondary batteries prepared in each embodiment are higher than those in the comparative embodiments.

Further, as can be seen from Embodiments 1 to 5 and Embodiments 6 to 11, specified types of oxygen-ion conductors and lithium ion conductors are used synergistically in Embodiments 1 to 5, so that the prepared secondary batteries are superior in the initial discharge efficiency, cycle performance, and rate performance concurrently.

What is described above is merely specific embodiments of this application, but is not intended to limit the protection scope of this application. Various equivalent modifications and replacements conceivable by any person skilled in the art without departing from the technical scope disclosed herein still fall within the protection scope of this application. Therefore, the protection scope of this application is subject to the protection scope of the claims.

What is claimed is:

1. A positive active material, wherein the positive active material comprises:

a core material, comprising a lithium-rich manganese-based positive electrode material; and a cladding layer, covering an outer surface of the core material, wherein the cladding layer comprises an oxygen-ion conductor and a lithium-ion conductor;

the oxygen-ion conductor comprises $La_2Mo_2O_9$;

the lithium-ion conductor comprises $LiLaO_2$ and $Li_2MoO_4$, a molar ratio between lanthanum atoms and molybdenum atoms in the cladding layer is 1:(1.02 to 1.1).

2. The positive active material according to claim 1, wherein the oxygen-ion conductor further comprises a fluorite-type oxygen-ion conductor, the fluorite-type oxygen-ion conductor comprises at least one of $ZrO_2$, $CeO_2$, or $GeO_2$.

3. The positive active material according to claim 1, wherein the molar ratio between the lanthanum atoms and the molybdenum atoms in the cladding layer is 1:(1.02 to 1.05).

4. The positive active material according to claim 1, wherein a content of lanthanum atoms in the cladding layer is 300 ppm to 5000 ppm; and/or a content of lanthanum atoms in the cladding layer is 500 ppm to 5000 ppm.

5. The positive active material according to claim 1, wherein a content of molybdenum atoms in the cladding layer is 1000 ppm to 4000 ppm; and/or a content of molybdenum atoms in the cladding layer is 1000 ppm to 3000 ppm.

6. The positive active material according to claim 1, wherein a surface of the core material is doped with lanthanum atoms and molybdenum atoms.

7. The positive active material according to claim 6, wherein a thickness of the surface of the core material doped with the lanthanum atoms and the molybdenum atoms is not greater than 3 μm, and optionally not greater than 2 μm.

8. The positive active material according to claim 1, wherein a thickness of the cladding layer is 0.01 to 4 μm.

9. The positive active material according to claim 1, wherein a thickness of the cladding layer is 0.02 to 1 μm.

10. The positive active material according to claim 1, wherein a peak intensity ratio between $IO_2^{2-}$ and $IO^{2-}$ in the cladding layer is 0.5 to 1, and optionally 0.7 to 0.9, wherein $IO_2^{2-}$ is a peak intensity value of an oxygen vacancy corresponding to 531 eV in an X-ray photoelectron spectroscopy test, and $IO^{2-}$ is a peak intensity value of lattice oxygen corresponding to 529 eV in the X-ray photoelectron spectroscopy test.

11. The positive active material according to claim 1, wherein a molecular formula of the lithium-rich manganese-based positive electrode material is $xLi_2MnO_3 \cdot (1-x)\ LiNi_yCO_zMn_aM_{1-y-z-a}O_2$, wherein $0<x<1$, $0 \le y \le 1$, $0 \le z \le 1$, $0 \le a \le 1$, $0<y+z+a \le 1$; and M is at least one of Mg, B, Al, V, Ti, Zr, Sn, or Mo.

12. The positive active material according to claim 1, wherein a particle type of the lithium-rich manganese-based positive electrode material is a secondary particle, a single crystal, or a quasi-single crystal; and/or a specific surface area of the lithium-rich manganese-based positive electrode material is less than 2.0 $m^2/g$, and optionally is 0.1 to 1 $m^2/g$; and a $Dv_{50}$ particle diameter of the lithium-rich manganese-based positive electrode material is 1 to 20 μm, and optionally 3 to 15 μm.

13. A method for preparing a positive active material the method comprising:

forming a cladding layer on a surface of a core material, wherein the core material comprises a lithium-rich manganese-based positive electrode material;

the cladding layer covers an outer surface of the core material and comprises an oxygen-ion conductor and a lithium-ion conductor;

the oxygen-ion conductor comprises $La_2Mo_2O_9$;

the lithium-ion conductor comprises at least one of $LiLaO_2$ and $Li_2MoO_4$;

a molar ratio between lanthanum atoms and molybdenum atoms in the cladding layer is 1:(1.02 to 1.1).

14. The preparation method according to claim 13, further comprising:

mixing a molybdenum salt, a lanthanum salt, and a lithium-rich manganese-based precursor in a solvent, and performing a hydrothermal reaction at 100° C. to 200° C. for 8 to 12 hours to obtain a surface deposited lithium-rich manganese-based precursor, wherein, $La_2Mo_2O_9$ is deposited in situ on a surface of the surface deposited lithium-rich manganese-based precursor; and mixing a lithium salt with the surface deposited lithium-rich manganese-based precursor containing the $La_2Mo_2O_9$ deposited in situ on the surface to form a mixture, and then calcining the mixture to obtain a positive active material compositely coated with the oxygen-ion conductor and the lithium-ion conductor.

15. The preparation method according to claim 14, wherein the lithium-rich manganese-based precursor is $Ni_bCo_cMn_aM_{(1-b-c-d)}(OH)_2$, wherein $0<b<0.4$, $0 \le c \le 0.05$, $0.6 \le d<1$, and M is at least one of Mg, B, Al, V, Ti, Zr, Sn, or Mo.

16. The preparation method according to claim 14, wherein the solvent is at least one of water, ethanol, methanol, or ethylene glycol; and/or the molybdenum salt is at least one of ammonium molybdate, sodium molybdate, or potassium molybdate; and/or the lanthanum salt is at least one of lanthanum chloride or lanthanum nitrate; and/or the lithium salt is at least one of lithium carbonate, lithium hydroxide, or lithium acetate; and/or a molar ratio between lithium in the lithium salt and all metal elements in the lithium-rich manganese-based precursor containing the $La_2Mo_2O_9$ deposited in situ on the surface is 1:(1.1 to 1.8), and optionally 1:(1.1 to 1.5); and/or a pH value of the hydrothermal reaction is 8 to 10; and/or an atmosphere for the calcination is air; and/or the calcination comprises: pre-calcining at 300° C. to 500° C. for 2 to 5 hours, and then sintering at 700° C. to 900° C. for 10 to 20 hours.

17. A positive electrode plate, comprising:

a positive current collector; and a positive active material layer, wherein the positive active material layer is located on a surface of the positive current collector and comprises the positive active material according to claim 1.

18. A secondary battery, comprising the positive electrode plate according to claim 17.

19. An electrical device, comprising the secondary battery according to claim 18.

* * * * *